(12) United States Patent
Kawaguti

(10) Patent No.: US 11,090,948 B2
(45) Date of Patent: Aug. 17, 2021

(54) LABEL PRINTER CONFIGURED TO REISSUE A LABEL WITH STORED PRINT INFORMATION

(71) Applicant: TOSHIBA TEC KABUSHIKI KAISHA, Tokyo (JP)

(72) Inventor: Takesi Kawaguti, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/797,986

(22) Filed: Feb. 21, 2020

(65) Prior Publication Data

US 2020/0307253 A1    Oct. 1, 2020

(30) Foreign Application Priority Data

Mar. 26, 2019    (JP) .............................. JP2019-059326

(51) Int. Cl.
*B41J 3/407* (2006.01)
*G06F 3/12* (2006.01)

(52) U.S. Cl.
CPC .......... *B41J 3/4075* (2013.01); *G06F 3/1204* (2013.01); *G06F 3/1234* (2013.01)

(58) Field of Classification Search
None
See application file for complete search history.

(56) References Cited

U.S. PATENT DOCUMENTS

| | | | | |
|---|---|---|---|---|
| 2007/0071193 | A1* | 3/2007 | Aoki | ................... H04M 7/0036 379/93.25 |
| 2007/0283155 | A1* | 12/2007 | Kato | ..................... H04L 9/3247 713/171 |
| 2017/0251112 | A1* | 8/2017 | Shimomura | .......... G06F 3/1256 |
| 2019/0035497 | A1* | 1/2019 | Kolberg | ................. G06Q 10/08 |

FOREIGN PATENT DOCUMENTS

| | | |
|---|---|---|
| GN | 104228364 A | 12/2014 |
| JP | 2014-121842 A | 7/2014 |

OTHER PUBLICATIONS

Office Action dated Apr. 28, 2021 in corresponding Chinese Patent Application No. 202010092006.1, 18 pages (With Translation).

* cited by examiner

*Primary Examiner* — Andrew H Lam
(74) *Attorney, Agent, or Firm* — Kim & Stewart LLP

(57) ABSTRACT

A label printer includes a printer for issuing labels and a processor. The processor sends print information to the printer for issuing a label and stores the number of labels issued by the printer with the print information. The number of labels is stored in correspondence with identifying information for specifying each label printed with the print information. The processor can receive a user selection indicating an already issued label and change the stored print information for the selected label. The processor then (re) issues a reissued label with changed print information. When the reissued label is (re)issued, the number of reissued labels is tracked and stored and the previously stored number of labels already issued by the printer with the same print information is reduced by the number of labels that have been reissued with the print information.

20 Claims, 11 Drawing Sheets

| COMMODITY NUMBER STORING SECTION | COMMODITY NAME STORING SECTION | ISSUED LABEL NUMBER STORING SECTION | LABEL DATA STORING SECTION |
|---|---|---|---|
| 1 | | | |
| 2 | | | |
| 3 | | | |
| ⋮ | ⋮ | ⋮ | ⋮ |

FIG. 10

| PROD : | COMMODITY B |
|---|---|
| DEADLINE | DEADLINE CONFIRMATION |
| USE-BY DATE | 11. 2.15 |
| CONSUMPTION LIFE | 2 DAYS |
| HOW TO KEEP | |
| CLASSIFYING CODE | OTHER |
| LABEL | 1 SUPER DAILY DISH |
| BARCODE | 2010002001989 |

PREVIOUS 2/4 NEXT

MEMORY

LABEL PRINTER CONFIGURED TO REISSUE A LABEL WITH STORED PRINT INFORMATION

CROSS-REFERENCE TO RELATED APPLICATIONS

This application is based upon and claims the benefit of priority from Japanese Patent Application No. 2019-059326, filed on Mar. 26, 2019, the entire contents of which are Incorporated herein by reference.

FIELD

Embodiments of the present disclosure relate to a label printer and a program used in label printing.

BACKGROUND

There is a label printer for printing a label at a store, the label is to be pasted on an item or product at the store, for example, the label is to be attached to a bag of fresh food to be cooked or already prepared daily dishes. These label printers issue labels on which information about the selected product or food is printed in accordance with pre-formatted data.

It may become difficult to view printed characters on labels attached to bags or products due to the influence of dirt, age-related deterioration or the like. In such a case, a conventional label printer utilizes the data of the previously issued label that has been stored, to reissues a label with the same information as the previous label.

BRIEF DESCRIPTION OF THE DRAWINGS

FIG. 10 is a diagram showing another example of a display of a label printer.

DETAILED DESCRIPTION

In general, according to one embodiment, a label printer includes a processor and a printer for issuing labels. The processor is configured to send print information to the printer for issuing a label and store the number of labels issued by the printer with the print information. The number of labels are stored in correspondence with label identifying information for specifying each label that has been printed with the print information. The processor can receive a user selection indicating an issued label which has already been printed by the printer with the print information, change the print information stored in correspondence with the label identifying information for the selected issued label, and issue a reissued label with the changed print information. When the reissued label is issued, the number of reissued labels is stored and the previously stored number of labels issued by the printer with the print information is reduced by the number of reissued labels.

One embodiment of the present invention will now be described with reference to the accompanying drawings. It should be noted that the present invention is not limited to the embodiments described above.

Figure 1:
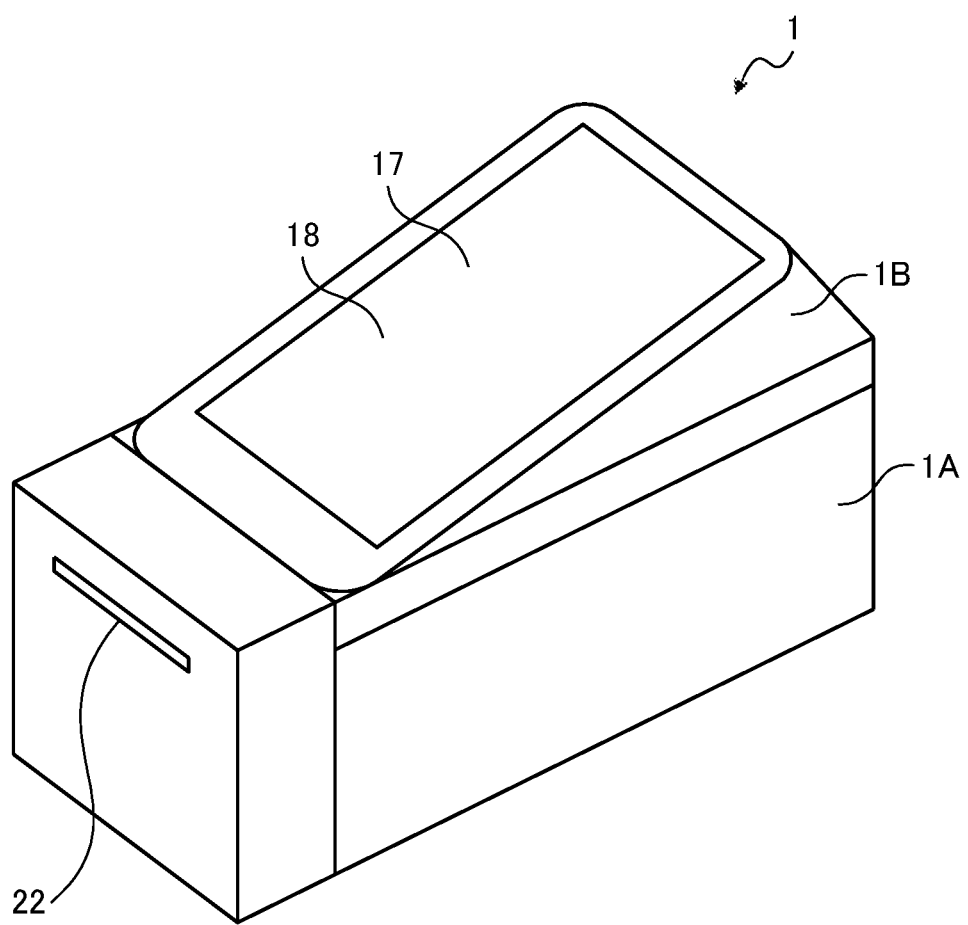
FIG. 1 is a perspective view showing an appearance of a label printer according to an embodiment.

FIG. 1 is a perspective view showing an overview of the label printer 1. In FIG. 1, the label printer 1 is provided with a main body 1A and a cover 1B. The main body 1A is provided with a printing unit 19 and a conveying unit 20 (see FIG. 2). The conveying unit 20 draws out the outermost peripheral portion of the roll-shaped label paper in which the labels stored in the main body 1A are arranged at regular intervals, and conveys the label paper to the printing unit 19. The printing unit 19 prints print information in a predetermined format with respect to labels attached to the conveyed label paper. Further, the printing unit 19 conveys the leading end portion of the printed label to the outside of the label printer 1 to issue a label, as output from label exit slot 22 of label printer 1 as shown in FIG. 1.

The cover 1B is provided with a display unit 17 on the top surface. The display unit 17 displays various information such as a state of the label printer 1, a state of label printing, and an error message, etc. The cover 1B is provided with an operation unit 18 comprising a touch panel disposed on or integrated with the display unit 17. The operation unit 18, also referred to as a user input device, receives various inputs (e.g., user selections and/or user instructions) associated with operating the label printer 1.

The main body 1A supports the cover 1B such that the cover 1B is openable upward with respect to the main body 1A and similarly closeable. The operator (user) can open the cover 1B from the main body 1A, and then place/load unprinted label paper in the main body 1A. Thereafter, the operator closes the cover 1B. In this manner, the operator sets the label paper in the label printer 1.

Figure 2:
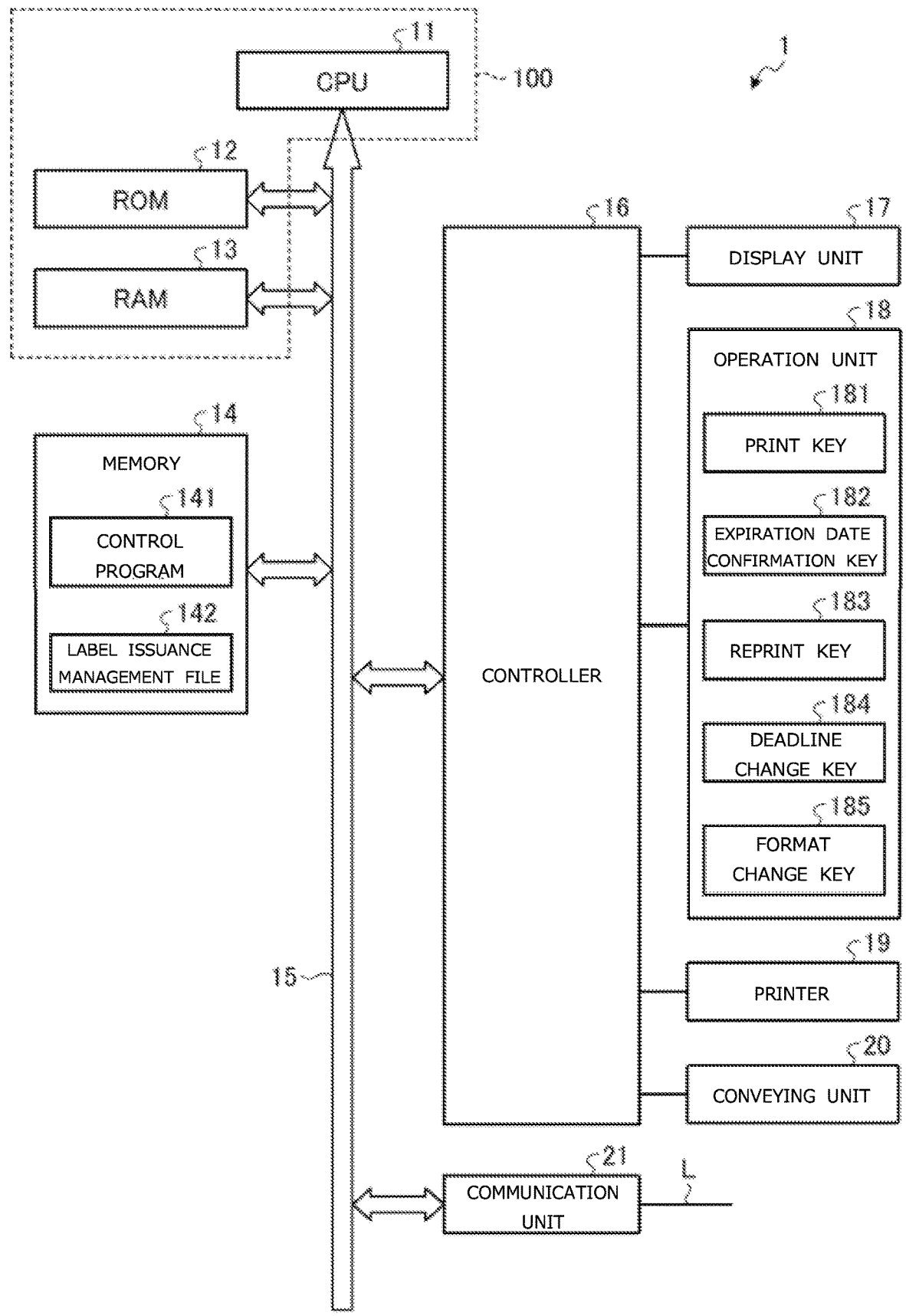
FIG. 2 is a block diagram showing a hardware configuration of a label printer.

Next, a hardware configuration of the label printer 1 according to the embodiment will be described. FIG. 2 is a block diagram showing a hardware configuration of the label printer 1. As shown in FIG. 2, the label printer 1 includes a CPU (Central Processing Unit) 11, a ROM (Read Only Memory) 12, a RAM (Random Access Memory) 13, a memory 14, and the like. The CPU 11 serves as an overall device controller. The ROM 12 stores various programs. The RAM 13 permits the loading of programs and manipulation of various kinds of data associated with execution of programs. The memory 14 stores various programs. The CPU 11, the ROM 12, the RAM 13, and the memory 14 are connected to each other via a bus 15. The CPU 11, the ROM 12, and the RAM 13 constitute a control unit 100. That is, the control unit 100 executes the control processing related to the label printer 1 by operations and functions of the CPU 11 in accordance with the control program stored in the ROM 12 and the memory 14 and loaded in the RAM 13.

The memory 14 is nonvolatile memory such as an HDD (Hard Disk Drive) or a flash memory in which storage information can be retained even when the power supply is turned off. The memory 14 includes a control program 141, a label issuance management file 142, and the like. The control program 141 stores a control program for controlling the label printer 1. The label issuance management file 142 will be described later with reference to FIG. 3.

Further, the control unit 100 is connected to the display unit 17, the operation unit 18, the printing unit 19, and the conveying unit 20 via the bus 15 and the controller 16. The display unit 17 displays information for the operator. The operation unit 18 provides a print key 181, an expiration date confirmation key 182, a reprint key 183, a deadline change key 184, and a format change key 185 at a position corresponding to the display of the respective keys displayed on the display unit 17. The print key 181 is pressed (or otherwise selected) to cause printing of information on a label. The expiration date confirmation key 182 pressed (or otherwise selected) when the re-issuance is to be started for a label that has already been issued. The reprint key 183 is pressed (or otherwise selected) when the label is reprinted. The deadline change key 184 is pressed (or otherwise selected) for changing expiration date information included in the label information, such as expiration date information indicating the consume-by date or the like. The format change key 185 is pressed (or otherwise selected) when the format data for specifying the format for printing information on the label is to be changed.

The printing unit 19 comprises, for example, a linear thermal head, and prints on a label sheet. The conveying unit 20 includes, for example, a conveyance belt and a conveyance motor, and conveys a label that is on label paper (base paper) to the printing unit 19. Further tore, the conveying unit 20 conveys the printed label to the issuing position (e.g., label exit slot 22).

Further, the control unit 100 is connected to the communication unit 21 via the bus 15. The communication unit 21 receives print information including a commodity name, format data, and the like from an information processing apparatus via a comunication line L such as a LAN (Local Area Network). The received print information, format data, and the like are stored in the RAM 13 or the memory 14 along with an added product number. The format data is information specifying one format from a plurality of possible formats to be printed on a label, and is information such as "super daily dish" (see FIG. 10). In general, a label printer 1 stores a plurality of types of formats that can be printed on a label in the memory 14, and when the format data specifying one particular format is received from an information processing device, the format corresponding to the received format data is read out (loaded) from the memory 14.

Figures 3, 4:
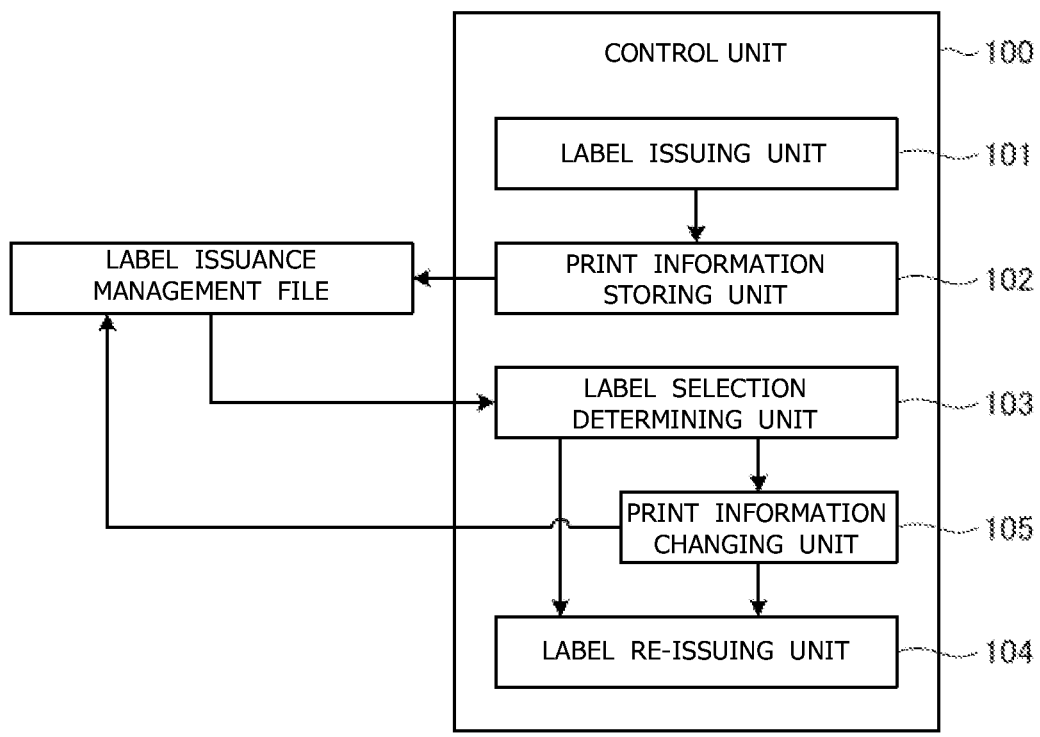
FIG. 3 is a diagram showing a memory configuration of an example record file.
FIG. 4 is a block diagram showing a functional configuration of a label printer.

Next, the label issuance management file 142 will be described. FIG. 3 is a diagram showing a memory configuration of the actual record file. As shown in FIG. 3, the label issuance management file 142 stores print information and format data to be printed on a label by the label printer 1. The label issuance management file 142 stores the print information and format data which has already been printed on a label by the label printer 1. The label issuance management file 142 includes a commodity number storing section 1421, a commodity name storing section 1422, an issued label number storing section 1423, and a label data storing section 1424. The commodity number storing section 1421 stores an identification number (label identifying information) for managing the labels being issued. The commodity name storing section 1422 stores the commodity name printed on the label in association with a commodity number stored in the commodity number storing section 1421.

The issued label number storing section 1423 stores the number of labels already issued (printed) in association with the product number in the commodity number storing section 1421. The label data storing section 1424 stores print information and format data to be printed on a label associated with the product number stored in the commodity number storing section 1421.

The functional configuration of the label printer 1 will now be described. FIG. 4 is a functional block diagram showing a functional configuration of a label printer. As shown in FIG. 4, the label printer 1 provides the functions of a label issuing unit 101, a print information storing unit 102, a label selection determining unit 103, a label re-issuing unit 104, and a print information changing unit 105, according to a control program 141 and loaded in RAM 13 by control unit 100.

The label issuing unit 101 has a function of printing print information on a label and outputting the print information. The label issuing unit 101 controls the printing unit 19 to receive the print information provided by the information processing apparatus and stored in the label issuance management file 142 (see FIG. 3), and causes the printing unit 19 to print the print information on a label in a format based on the format data stored in the record file. When the print key 181 is operated, the label issuing unit 101 prints print information on the label (or multiple labels) being issued, and outputs a label. The label issuing unit 101 prints print information including the expiration date information on a label.

The print information storing unit 102 has a function of storing print information and format data for the labels printed/issued by the label issuing unit 101 in the label issuance management file 142. When the label issuing unit 101 prints, for example, three (3) labels, the print information storing unit 102 stores three (3) separate entries (instances) of print information in the label issuance management file 142. The print information storing unit 102 stores print information and format data received from the information processing apparatus under the same item number in the label issuance management file 142. The print information storing unit 102 stores the print information including the print information including the expiration date information in the actual file in association with the product number of the print information The label selection determining unit 103 has a function of determining the selection of a label to which printing has been completed. When the expiration date confirmation key 182 is operated, label information of a label which becomes a time limit is extracted in a specified period based on the expiration date information stored in the label issuance management file 142, and is displayed on a display unit 17. The label selection determining unit 103 determines a label of the label information selected by the operator from the displayed label information.

The print information storing unit 102 reissues a label printed on the label selected by the label selection determining unit 103 based on the print information of the label stored in the print information storing unit 102.

The print information changing unit 105 changes a portion of the print information of the label stored in the print information storing unit 102. For example, the print information changing unit 105 changes expiration date information for the label stored in the print information storing unit 102. The print information changing unit 105 may also change the format data of the label stored in the print information storing unit 102.

The label re-issuing unit 104 reissues a label on which print information changed by the print information changing unit 105 is printed. The print information storing unit 102 reissues a label which has print information that has been printed based on the format data that was changed by the print information changing unit 105.

The print information storing unit 102 changes the stored print information. When the label re-issuing unit 104 reissues the label printed with print information changed by the print information changing unit 105, the print information storing unit 102 indicates a label has been reissued by subtracting the number of reissued labels from the number of already issued labels and adding the number for the newly re-issued label(s) by adding another product number for the re-issued label to the label re-issuing unit 104.

Figure 5:
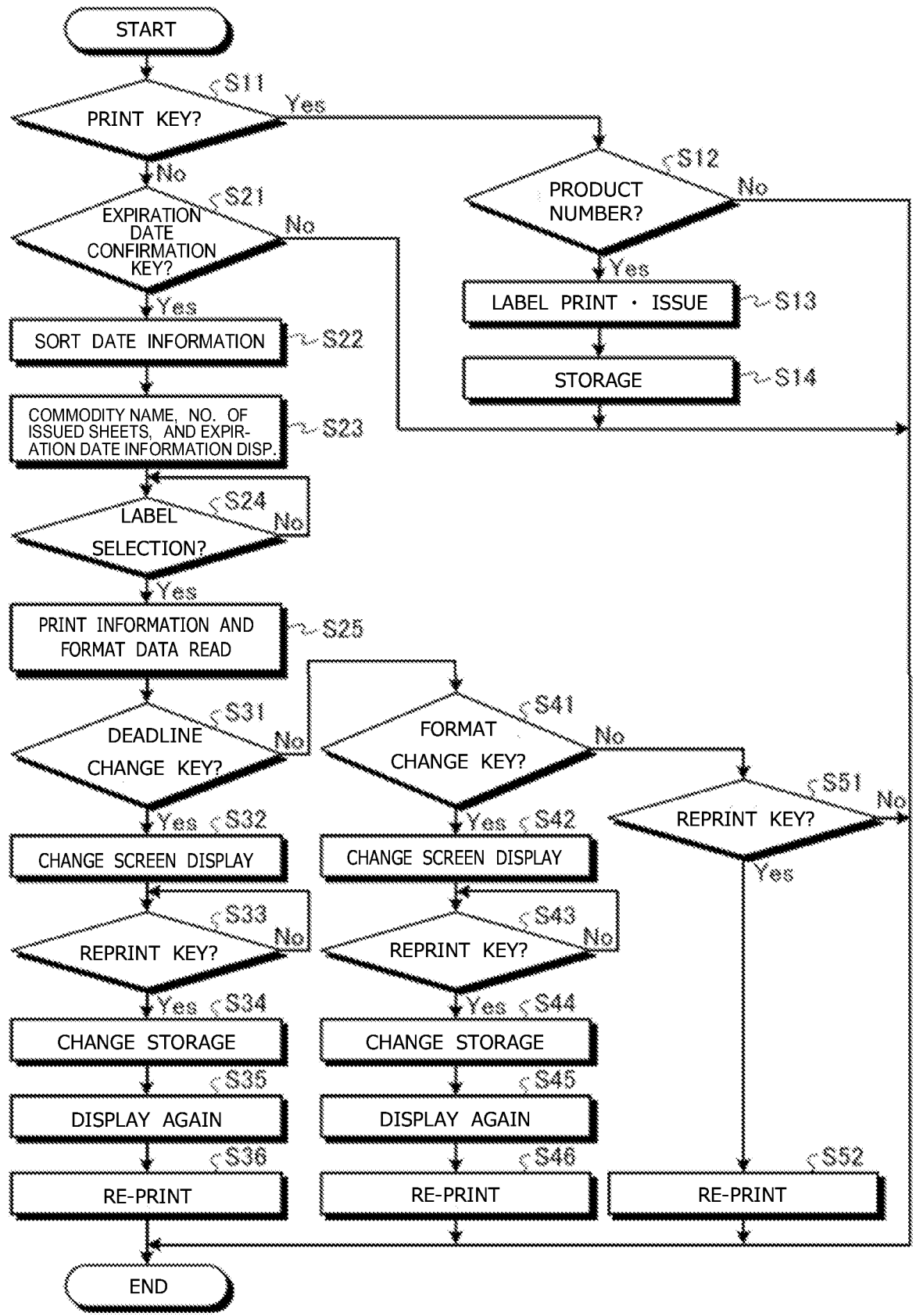
FIG. 5 is a flowchart of a control process of a label printer.

The control of the label printer 1 will now be described. In the embodiment, print information and format data received from an information processing apparatus are stored in the label issuance management file 142 in association with a product number. FIG. 5 is a flowchart showing a flow of the control process of the label printer. The control unit 100 of the label printer 1 determines whether or not the print key 181 has been operated (S11). When it is determined that the print key 181 has been operated (Yes in S11), it is next determined whether or not a product number (along with the number of labels to be printed with the same product number) has been input via the operation unit 18 (S12). When it is determined that the product number has been input (Yes in S12), the label issuing unit 101 prints information on a label on the basis of the print information and format data stored in the label data storing section 1424. When an only a single label is to be printed, the label issuing unit 101 issues a single label (S13). When multiple labels with the same product number are to be printed, the label issuing unit issues multiple labels. Then, the print information storing unit 102 stores the print information that has been printed on the label(s), the number of issued labels, and the commodity name included in the print information in the label issuance management file 142 in association with the product number (S14). Then, the control unit 100 ends the process. When it is determined that a product number has not been input (No in step S12), the control unit 100 terminates the processing.

Figure 6:
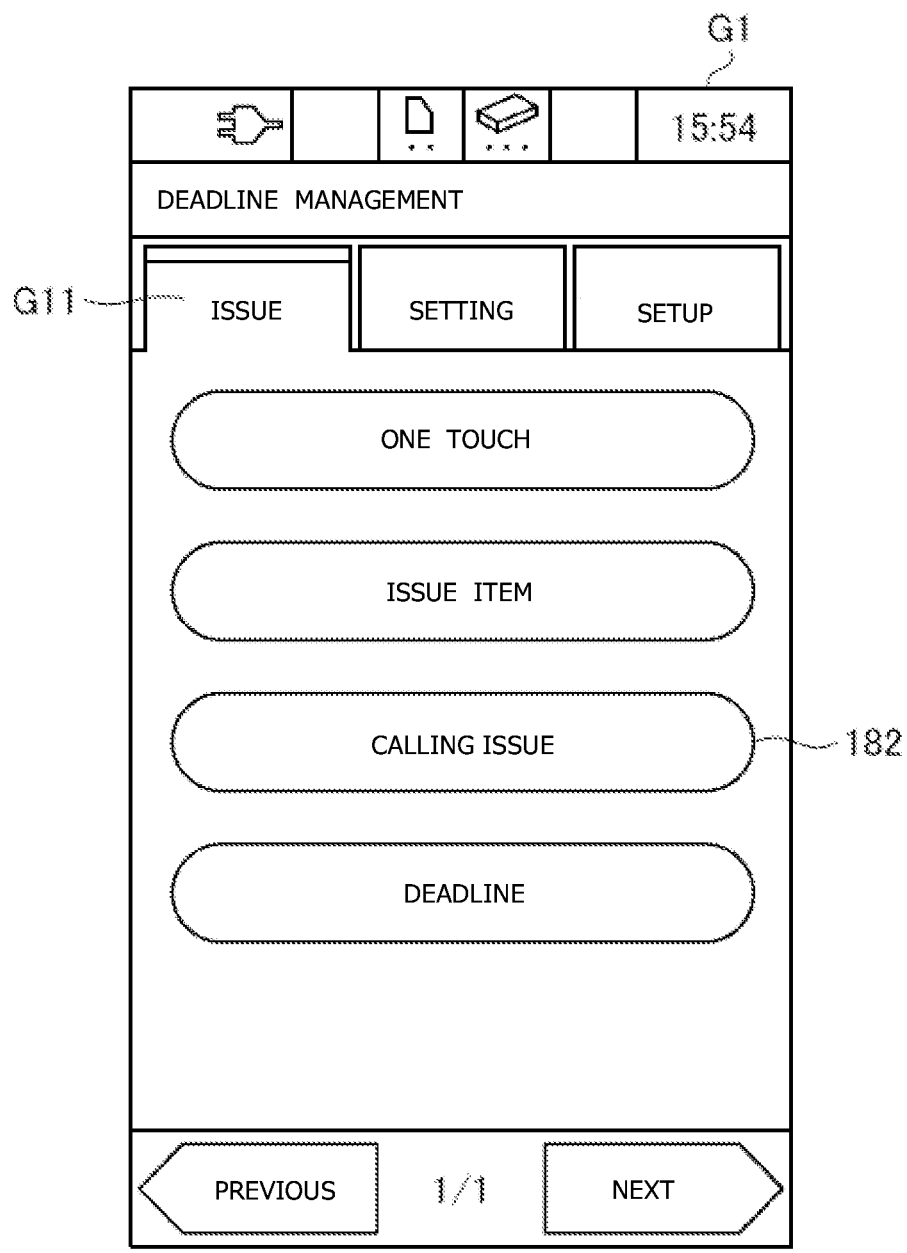
FIG. 6 is a diagram showing an example of a display of a label printer.

When the print key 181 has not been operated (No in S11), the control unit 100 determines whether or not the expiration date confirmation key 182 has been operated (S21). FIG. 6 shows an example of a screen for operating the expiration date confirmation key 182. When the issuance tag G11 is pressed on the displayed screen G1, a plurality of operation keys including the expiration date confirmation key 182 are displayed. When a label is to be reissued, the operator presses the expiration date confirmation key 182. When the expiration date confirmation key 182 is pressed, the control unit 100 determines that the expiration date confirmation key 182 has been operated.

When it is determined that the expiration date confirmation key 182 is operated (Yes in S21), the control unit 100 reads the data for the label that has been stored in the label issuance management file 142, and sorts the information of the label in the order of the expiration date information included in the print information (S22). Then, the control unit 100 displays label information of the sorted label (e.g., the commodity name stored in the commodity name storing section 1422, the number of issued labels stored in the issued label number storing section 1423, and the expiration date information) (S23).

Figure 7:
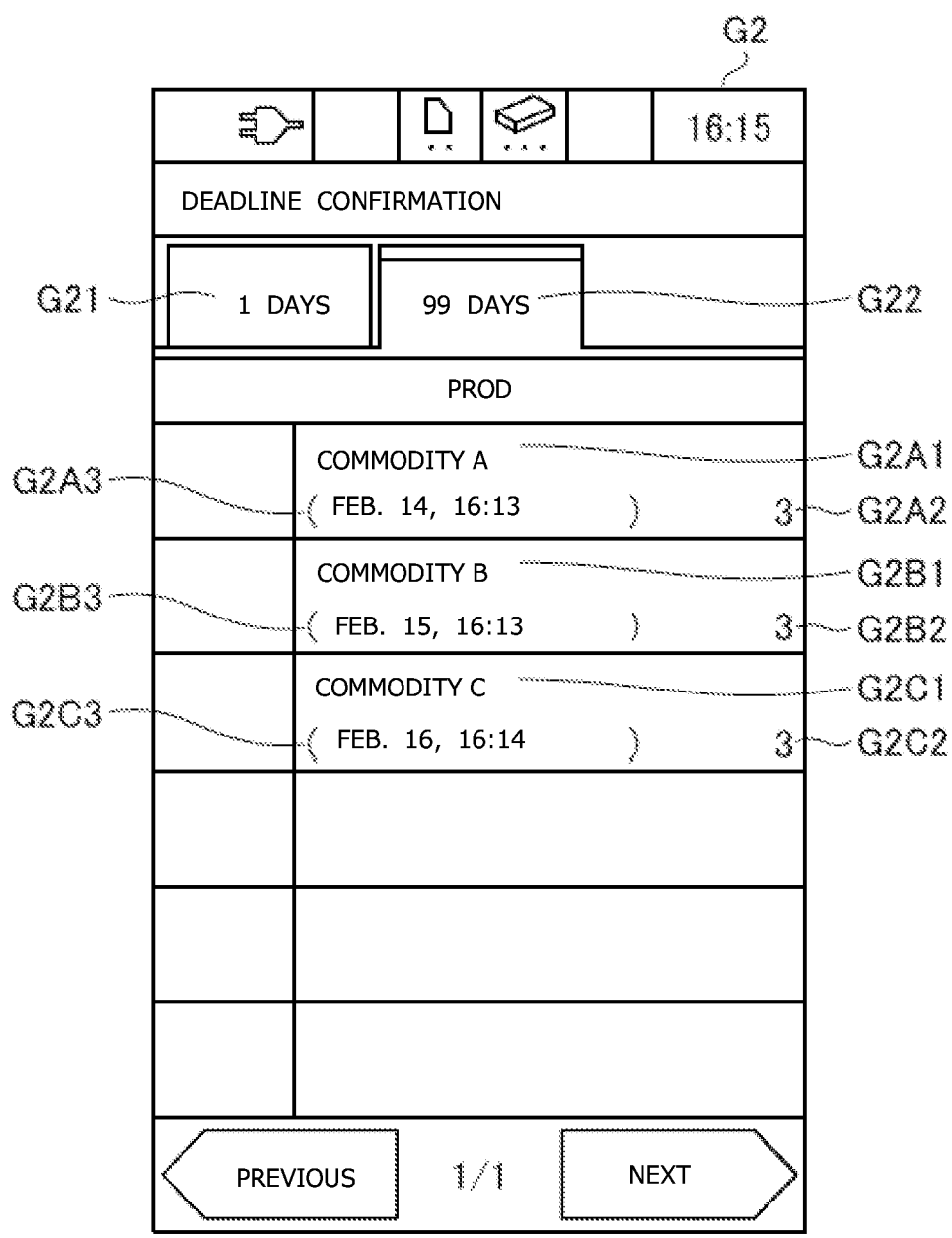
FIG. 7 is a diagram showing another example of a display of a label printer.

FIG. 7 shows an example in which label information sorted in the order of expiration date information is displayed on the display unit 17. As shown in FIG. 7, the screen G2 displays the one day tag G21 and the 99 days tag G22. When the 1 day tag G21 is operated, label information that becomes the consume-by date is displayed in the latest day. When the 99 days tag G22 is operated, information of the label is displayed for all labels stored in the label issuance management file 142. In the example shown in FIG. 7, an example in which the 99 days tag G22 is operated is displayed. As shown in FIG. 7, the commodity A's commodity name G2A1 (commodity A), the issue number G2A2 (3), and the expiration date information G2A3 (February 14, 16:13) are displayed in the field of the commodity A as the label information of the commodity A. In the column of the commodity B, the commodity name G2B1 (commodity B), the issue number G2B2 (3), and the expiration date information G2B3 (February 14, 16:13) are displayed. In the column of the commodity C, a commodity G2C1 (commodity C), an issue number G2C2 (3), and an expiration date information G2C3 (February 16, 16:14) are displayed.

Figure 8:
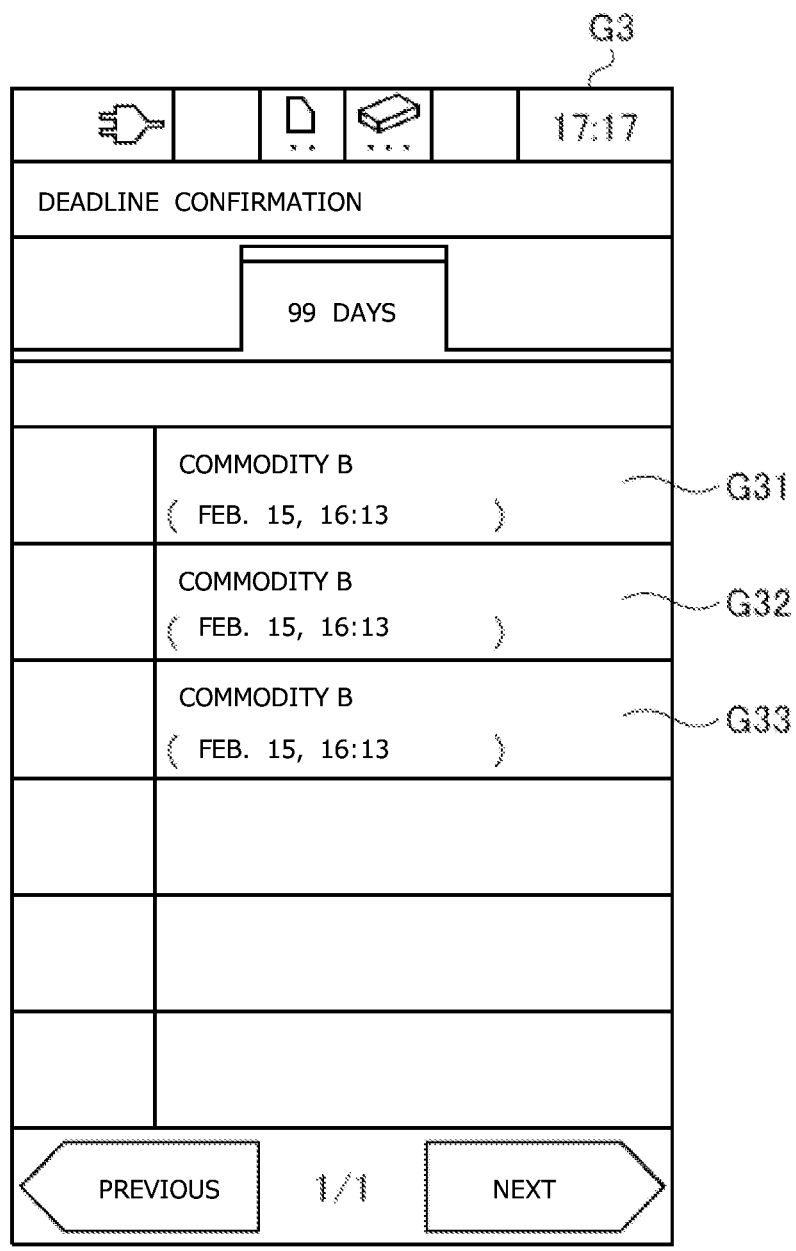
FIG. 8 is a diagram showing still another example of a display of a label printer.

Via screen G2 shown in FIG. 7, the operator touches a column of label information to be re-issued out of a plurality of displayed columns. FIG. 8 shows an example of a case where the label information column of the commodity B is touched in the screen G2 shown in FIG. 7. In the case where the label information column of the label information of the commodity B is touched, since three labels related to the commodity B have been previously issued in this example, the information of the three labels related to the commodity B is displayed, as shown in FIG. 8. In FIG. 8, the information G31 of the first label, the information G32 of the second label, and the information G33 of the third label are displayed. The information G31 of the first label, the information G32 of the second label, and the information G33 of the third label are managed under the same product number, and here contain all the same information. When the operator touches the column of the label to be re-issued for the three labels displayed, the label selection determining unit 103 determines that a label has been selected.

The operator selects one label, reissues the same label, reissues a label with a modified deadline, or reissues a label with a modified format. When the same label is to be re-issued, the operator presses the reprint key 183. When a label with a changed deadline is to be reissued, the operator presses the deadline change key 184. When a label with a changed format is to be reissued, the format change key 185 is pressed.

The label selection determining unit 103 determines whether a label has been selected (S24). When a label is not specified/selected (No in S24), and the label selection determining unit 103 determines that a label has not been selected. When a label is specified/selected (No in S24), and the label selection determining unit 103 determines that a label has been selected (Yes in S24), the control unit 100 reads print information and format data from the label data storing section 1424 for the selected label (S25).

Next, the control unit 100 determines whether or not the deadline change key 184 has been operated (S31). When it is determined that the deadline change key 184 has not been operated (No in S31), the control unit 100 next determines whether or not the format change key 185 has been operated (S41). When it is determined that the format change key 185 has not been operated (No in S41), the control unit 100 determines next whether or not the reprint key 183 has been operated (S51).

When it is determined in S51 that the reprint key 183 has been operated (Yes in S51), the label re-issuing unit 104 controls the printing unit 19 and prints a label by using the print information and format data read in S25 (based on the print information and format data) (S52). At this time, the total number (count) of re-issued labels is not changed. Therefore, when a label is re-issued, there is no increase or decrease in the counted (tracked) number of labels issued under the same product number.

Figure 9:
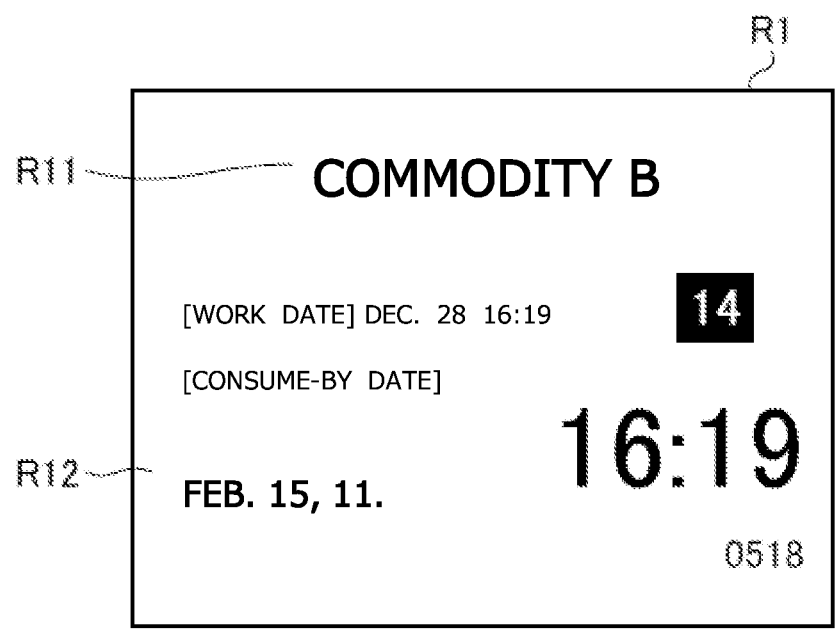
FIG. 9 depicts a label issued by a label printer.

FIG. 9 shows an example of the label re-issued in S52. The re-issued label R1 is printed with the commodity name R11, the expiration date information R12, and the like. The label that was re-issued in S52 is printed with the same information as that of the original label.

Then, the control unit 100 ends the process after S52. If it is determined in step S51 that the reprint key 183 is not operated (No in step S51), the control unit 100 also ends the processing.

When it is determined in S31 that the deadline change key 184 has been operated (Yes in S31), the control unit 100 displays a change screen in which print information is displayed for the label determined to be selected in S24 (S32).

FIG. 10 shows an example of the change screen G4 displayed in the step S32. As shown in FIG. 10, the change screen G4 displays information including the expiration date information (also referred to herein as "use-by date information") G41 and the format data G42. In the embodiment, "11.2.15" is displayed in the expiration date information G41, and the format of the "super daily dish" is displayed in the format data G42. When the expiration date information is changed, the expiration date information G41 is overwritten and changed. When the format data is changed, the format data (also referred to herein as "label data") G42 is overwritten with new data or the new format data can be selected by using a pull-down or pop-up menu or the like.

In this example, the operator views the change screen G4, and changes the expiration date information from "11.2.15" to "11.2.13". For example, such a reduction in the expiration date may be necessary in the case where a labeled product is deteriorating faster than expected for other instances of the same commodity or product type. Thus, a new label having an expiration date sooner than that of the other instances of the same commodity type can be reissued and attached.

The control unit 100 determines whether or not the reprint key 183 has been operated (S33). When it is determined that the reprint key 183 is not operated (No in step S33), the process waits until the reprint key 183 is operated (Yes in step S33). The reprint key 183 is pressed, the print information changing unit 105 overwrites the print information including the information modified in step S32 with the label data storing section 1424 and stores the print information (step S34).

At this time, among the labels read in S25, the label whose expiration date information has been changed is given a new product number different from the number of the original label, and is stored in the label issuance management file 142. Then, the number of labels to which product numbers are attached is reduced for the original label. That is, the number of labels stored in the label issuance management file 142 is changed. In this example, the time limit was changed for one label on a commodity B. Therefore, a new number (reduced by one from the original number) reflecting the change in number is stored in the label issuance management file 142. Therefore, even when the label is reissued, there is no increase or decrease in the total number of labels that are stored.

Figure 11:
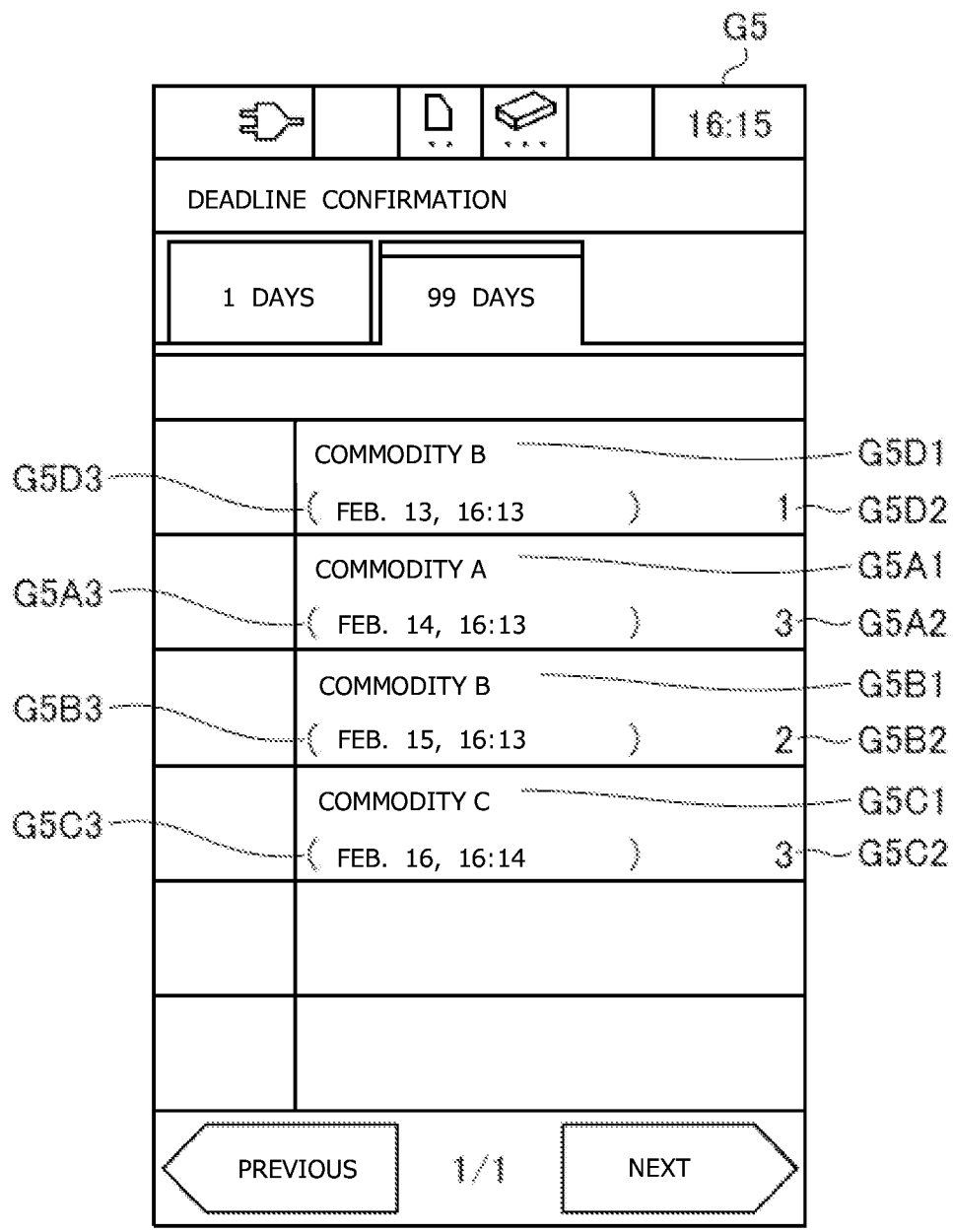
FIG. 11 is a diagram showing still another example of a label printer display.

Next, based on the print information overwritten in S34, the control unit 100 re-displays the updated label information that was previously displayed in FIG. 7 (S35). FIG. 11 shows an updated screen of label information. As shown in FIG. 11, the updated screen G5 displays the same information as that shown in FIG. 7 for commodity A and the commodity C. On the other hand, since the label information of commodity B has been changed (e.g., the expiration date information for one of the labels has been changed), the label information for commodity B includes label information for the changed (new) commodity B, under the commodity name G5D1 (commodity B) along with the issue number G5D2 (value of 1), and the changed/updated expiration date information G5D3 (February 13, 16:13) for this particular commodity B are displayed. On the other hand, in the entry for the original commodity B, the commodity name G2B1 (commodity B) of the commodity B and the expiration date information G2B3 (February 15, 16:13) are displayed, but the number of issued labels of the original commodity B is displayed with a value of reduced to 2 as compared to the issue number G2B2 (equal to 3) as shown in the display in FIG. 7.

Figure 12:
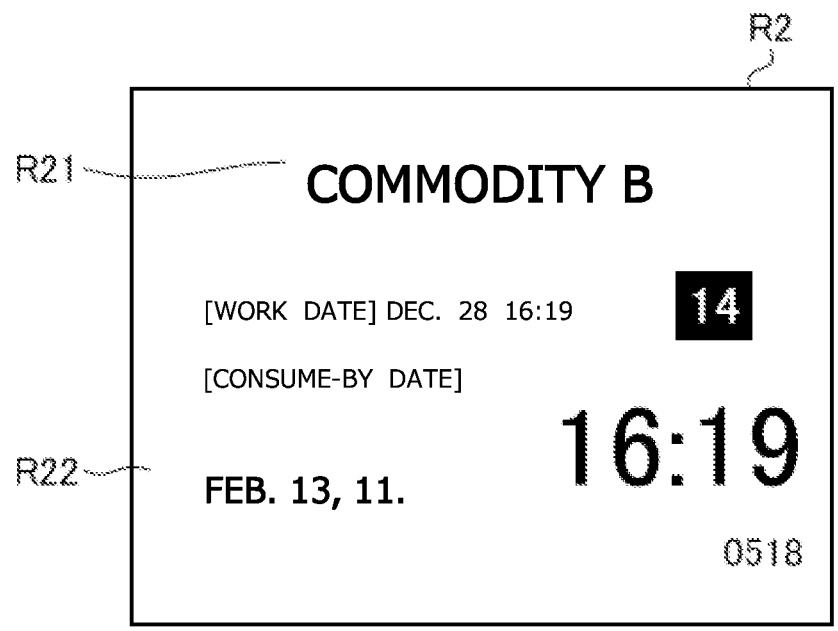
FIG. 12 depicts another example of a label issued by a label printer.

Next, based on the print information and format data read in S25, the label re-issuing unit 104 prints out the label whose expiration date information has been changed from the print information, and reissues the print information (S36). Then, the control unit 100 ends the process. FIG. 12 shows an example of the label re-issued in S36. As shown in FIG. 12, the re-issued label R2 is printed with information including the commodity name R21 of the commodity to which the label is to be attached and the expiration date information R22. Here, the expiration date information "February 13, 11." which is changed and stored in S34 is printed in the expiration date information R22.

When it is determined in step S41 that the format change key 185 has been operated (Yes in step S41), the control unit 100 displays the change screen shown in FIG. 10 in which the print information is displayed on the label determined to be selected in step S24 (step S42).

In FIG. 10, format data that is displayed in format data G42 is modified in order to change format data for the label. In the example, the format of the "super daily dish" was selected, but the "super daily dish" can be changed to the other format types.

Next, the control unit 100 determines whether or not the reprint key 183 has been operated (S43). When it is determined that the reprint key 183 is operated (No in step S43) and the reprint key 183 is operated (Yes in step S43), the print information changing unit 105 overwrites the print information including the information modified in step S32 with the label data storing section 1424 and stores the print information (step S44). At this time, out of the labels read in S22, the label whose format data is being changed is added with a new product number different from the product number of the original label, and is stored in the label issuance management file 142. Then, the number of labels to which new product numbers are being attached is subtracted from the total for the original labels. That is, the number of labels stored in the label issuance management file 142 is subtracted from the number of original labels. In this example, the format was changed for one label of a commodity B. Therefore, even when a label is reissued, there is no increase or decrease in the total number of labels that are stored.

Figure 13:
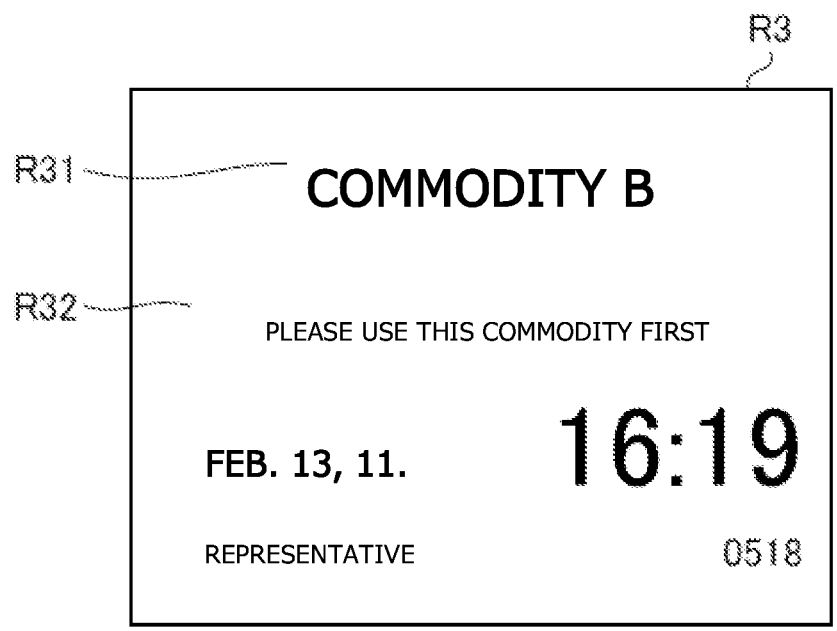
FIG. 13 depicts yet another example of a label issued by a label printer.

Next, based on the print information overwritten in S44, the control unit 100 re-displays updated label information (S45). Next, the print information storing unit 102 prints and reissues the print information on the basis of the changed format data (S46). Then, the control unit 100 then ends the process. FIG. 13 shows an example of a label re-issued in S46. As shown in FIG. 13, the re-issued label R3 is printed with information including the commodity name R31 of the commodity to which the label is attached and information R32 to be printed in order to change the label format. Here, the text "Please use this commodity first" is printed on the information R32. Then, the control unit 100 ends the process.

If it is determined in step S21 that the expiration date confirmation key 182 is not pressed (No in step S21), the control unit 100 ends the process.

As described above, according to the label printer 1 of the embodiment, the print information and format information of each issued label is stored, and based on the stored print information and format information, the same label can be reissued. Therefore, when the label is reissued, the label can be re-issued without receiving the print information and the format data from the information processing apparatus again.

According to the embodiment, it is also possible to change print information and format data of a label to be reissued.

In addition, according to the embodiment, since the re-issued labels is not counted as new labels, there is no increase in the counted total number of issued labels.

For example, in an embodiment, the expiration date information and the format data were described as examples of information that can be modified. However, the present disclosure is not limited thereto, and other information used for printing a label or printed on a label may be changed.

In addition, in an embodiment, the label printer 1 and the information processing apparatus are described as separate apparatuses. However, the present disclosure is not limited thereto, and the label printer 1 (or the functions thereof) and the information processing apparatus (or the functions thereof) may be integrated into one unit. In such a case, the actual record data of the re-printed label can output to the actual record file. At this time, when the actual result data are displayed in a list on the time limit confirmation screen, the actual result data are written so that the actual record data before the sign time and the actual print result data are not displayed twice. When the reprinting is executed a plurality of times, only the actual result data which has been re-printed is displayed.

The program executed in the label printer 1 in an embodiment can be recorded on a non-transitory, computer-readable recording medium such as a CD-ROM, a flexible disk (FD), a CD-R, a digital versatile disk (DVD), or the like, in an installable format or a file in an executable format.

Further, the program executed by the label printer 1 of an embodiment may be stored on a computer connected to a network such as the Internet and downloaded via a network. Further, the program executed by the label printer 1 of an embodiment may be provided or distributed across a network such as the Internet.

Further, the program executed by the label printer 1 of an embodiment may be provided in advance by being incorporated into a ROM or the like.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the inventions.

What is claimed is:

1. A label printer, comprising:
a printer for issuing labels;
a storage unit; and
a processor configured to:
generate print information for issuing a label by the printer;
store in the storage unit the number of labels issued by the printer with the print information, the number of labels being stored in correspondence with label identifying information for specifying each label printed with the print information;
upon receipt of a user operation for the issued label, change the print information stored in the storage unit in correspondence with the label identifying information and according to the user operation; and
issue a reissued label with the changed print information, wherein
when the reissued label is issued, the number of reissued labels is stored in the storage unit and the previously stored number of labels issued by the printer with the print information is reduced by the number of reissued labels.

2. The label printer according to claim 1, wherein the processor is further configured to:
cause the stored print information to be overwritten with the changed print information.

3. The label printer according to claim 1, wherein the processor is further configured to:
change label format data for specifying a format for printing the print information according to the user operation.

4. The label printer according to claim 1, wherein use-by date information in the print information is changed.

5. The label printer according to claim 1, wherein the printer is a thermal printer.

6. The label printer according to claim 1, further comprising:
a display configured to display a screen through which the user operation is input.

7. The label printer according to claim 1, wherein the print information includes a product expiration date for a product to which the label is to be affixed and a label issue time.

8. The label printer according to claim 1, further comprising:
a display configured to display a first key for reissuing a label that has been printed by the printer with corresponding print information and a second key for the user operation to change the print information.

9. A label printer controller unit, comprising:
a storage unit; and
a processor configured to:
generate print information for issuing a label by a printer;
store in the storage unit the number of labels issued by the printer with the print information, the number of labels being stored in correspondence with label identifying information for specifying each label printed with the print information;
upon receipt of a user operation for the issued label, change the print information stored in the storage unit in correspondence with the label identifying information and according to the user operation; and issue a reissued label with the changed print information, wherein when the reissued label is issued, the number of reissued labels is stored in the storage unit and the previously stored number of labels issued by the printer with the print information is reduced by the number of reissued labels.

10. The label printer controller unit according to claim 9, wherein the processor is further configured to:

cause the stored print information to be overwritten with the changed print information.

11. The label printer controller unit according to claim 9, wherein the processor is further configured to:

change label format data for specifying a format for printing the print information according to a user selection.

12. The label printer controller unit according to claim 9, wherein use-by date information in the print information is changed.

13. The label printer controller unit according to claim 9, wherein the print information includes a product expiration date for a product to which the label is to be affixed and a label issue time.

14. The label printer controller unit according to claim 9, wherein the processor is further configured to generate a screen showing a first key for reissuing a label that has been printed by the printer with corresponding print information and a second key for the user operation to change the print information.

15. A non-transitory computer readable medium storing program instructions that when executed by a processor of a label printer cause the processor to:

generate print information for issuing a label by a printer;

store in a storage unit of the label printer the number of labels issued by the printer with the print information, the number of labels being stored in correspondence with label identifying information for specifying each label printed with the print information;

upon receipt of a user operation for the issued label, change the print information stored in the storage unit in correspondence with the label identifying information and according to the user operation; and issue a reissued label with the changed print information, wherein when the reissued label is issued, the number of reissued labels is stored in the storage unit and the previously stored number of labels issued by the printer with the print information is reduced by the number of reissued labels.

16. The non-transitory computer readable medium according to claim 15, further causing the processor to:

change label format data for specifying a format for printing the print information according to a user selection.

17. The non-transitory computer readable medium according to claim 15, wherein use-by date information in the print information is changed.

18. The non-transitory computer readable medium according to claim 15, wherein the print information includes a product expiration date for a product to which the label is to be affixed and a label issue time.

19. The non-transitory computer readable medium according to claim 15, further causing the processor to display a user interface screen on a display unit of the label printer.

20. The non-transitory computer readable medium according to claim 19, wherein the user interface screen includes a reprint key and a print key.

\* \* \* \* \*